United States Patent [19]

Morikawa et al.

[11] Patent Number: 4,972,692
[45] Date of Patent: Nov. 27, 1990

[54] KEY-OPERATED IGNITION DEVICE

[75] Inventors: Minoru Morikawa; Tomonori Kawachi, both of Aichi, Japan

[73] Assignee: Kabushiki Kaisha Tokai Rika Denki Seisakusho, Aichi, Japan

[21] Appl. No.: 430,771

[22] Filed: Nov. 1, 1989

[30] Foreign Application Priority Data

Nov. 10, 1988 [JP] Japan .......................... 63-147016[U]

[51] Int. Cl.$^5$ ............................................ B60R 25/02
[52] U.S. Cl. .......................................... 70/186; 70/252
[58] Field of Search ................. 70/237, 252, 185, 186; 200/43.03

[56] References Cited

U.S. PATENT DOCUMENTS

| | | | |
|---|---|---|---|
| 3,172,968 | 3/1965 | Arendt | 200/43.03 |
| 3,622,718 | 11/1971 | Lipschutz | 200/43.03 |
| 3,632,916 | 1/1972 | Schaad | 200/43.03 |
| 3,643,044 | 2/1972 | Batcheller | 200/43.03 |
| 4,292,483 | 9/1981 | Roytberg | 200/43.03 |
| 4,659,883 | 4/1987 | Poschet | 200/43.03 |

Primary Examiner—Robert L. Wolfe
Attorney, Agent, or Firm—Finnegan, Henderson, Farabow, Garrett, and Dunner

[57] ABSTRACT

A key-operated ignition device which prevents an engine starter from being driven while the engine is already running, so to protect the starter and engine from damage. The device comprises a key-operated rotor disposed in the device for turning a locking cam via a coupling plate to shift an ignition switch between off, on and start positions. A sliding member is selectively movable between first and second positions by a restriction plate, wherein when the sliding member is in the first position the rotor may be turned from the on position to the start position and when the member is in the second position, the rotor is prevented from again turning from the on position to the start position, without first turning to the off position. The restriction plate also prevents the rotor from being directly turned from the off position to a lock position.

14 Claims, 6 Drawing Sheets

KEY-OPERATED IGNITION DEVICE

BACKGROUND OF THE INVENTION

1. Field of the Invention

The present device relates to a key-operated ignition device in which an engine starter is prevented from being turned into an engine start operation once an engine is already running.

2. Description of the Prior Art

Since the noise level of modern motor vehicle engines is so low it is difficult to judge whether the engine is already running or not, and it is likely to turn an ignition key to drive an engine starter while an engine is already running.

If the engine starter is driven while the engine is already running, the engine and the engine starter are likely to be damaged.

SUMMARY OF THE INVENTION

Accordingly, it is an object of the present invention to provide a key-operated ignition device which acts to prevent an engine starter from being driven while an engine is already running, thus, protecting the engine and the engine starter from damage. The number of component parts is decreased because a restriction plate for the prevention of driving the starter also acts to prevent a rotor from being turned directly from a switch-off position into a locking position which is for locking a steering gear, thus decreasing the number of components and simplifying the device.

To achieve the objects and in accordance with the purpose of the invention, as embodied and broadly described herein, the invention comprises a key-operated ignition device comprising a rotor operatively turned by a key, the rotor being disposed in a cylindrical case, a rotor driven coupling plate fitted on one end of the rotor, means for selectively shifting an ignition switch between switch-off, switch-on, and start positions, the shifting means being coupled to the coupling plate, a sliding member disposed in the case and selectively movable between first and second positions along a longitudinal axis of the case, restriction means in cooperation with the shifting means for moving the sliding member between the first and second positions and when the sliding member is in the first position the rotor can be turned from the switch-on to the start position and when the sliding member is in the second position the rotor is prevented from again turning to the start position without first turning from the switch-on position to the switch-off position. The restriction means also prevents the rotor from being directly turned from said switch-off position to a lock position.

Due to the first feature of the key-operated ignition device provided in accordance with the present invention, after the key operated rotor is once turned from a switch-on position to a start position to start the engine, the rotor is automatically turned back to the switch-on position but prevented from being turned from the switch-on position to the start position directly again. If the rotor is to be turned to the start position again, the rotor needs to be first turned to a switch-off position. When the key operated rotor is turned to the switch-off position as the engine is running, the engine is stopped. Thus, the engine starter is prevented from being driven when the engine is running.

The restriction member, which acts to prevent the rotor from being turned from the switch-on position into the start position a second time, also acts to prevent the rotor from being turned into the locking position which is for locking the steering gear directly from the switch-off position, thus a decrease in the number of the component parts of the device makes the device relatively simple.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

Reference will now be made in detail to the present preferred embodiments of the invention, examples of which are illustrated in the accompanying drawings.

Figure 3:
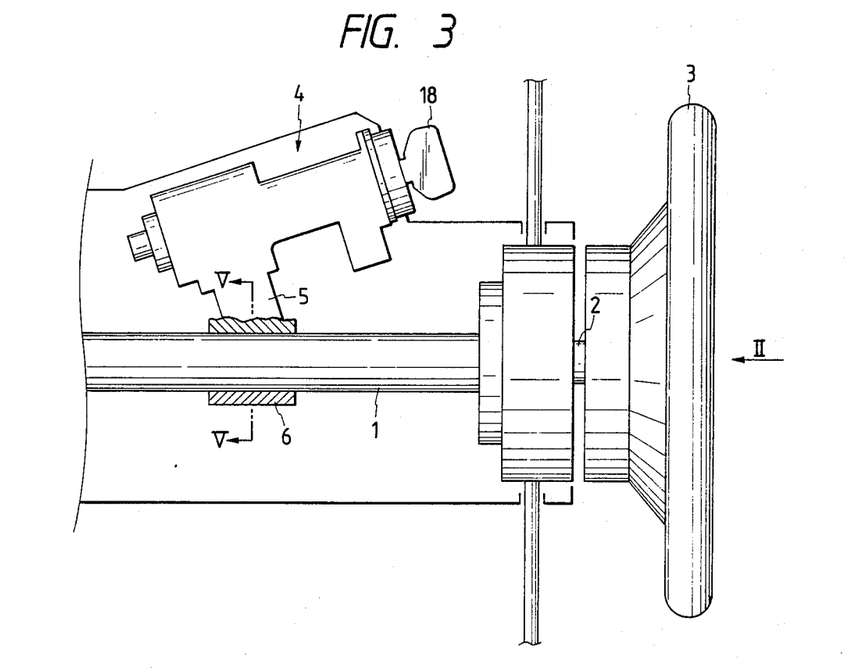
FIG. 3 is a cutaway plan view of the device along arrow IV of FIG. 1.
Figure 5:
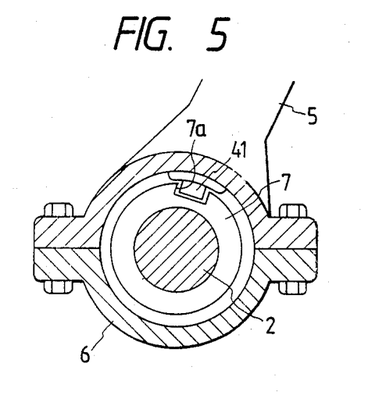
FIG. 5 is a sectional view of the device along line V—V of FIG. 3.

The key-operated ignition device is particularly intended for use in conjunction with a motor vehicle engine starter. As depicted in FIG. 3, the key-operated ignition device is preferably incorporated with a steering gear tube 1, a steering shaft 2 extending through the tube, a steering wheel 3 secured to the shaft at the upper end thereof, and a key-operated ignition appliance 4 which is the device of the present invention and has a function of locking the steering gear of a motor vehicle. The cylindrical case 5 of the appliance 4 is secured to the steering gear tube 1 by a mounting member 6. As shown in FIG. 5, a locking ring 7 having a locking groove 7a is secured to the outside circumferential surface of the steering gear tube 1 by welding or the like so that the ring corresponds to the case 5 of the appliance 4.

Figure 1:
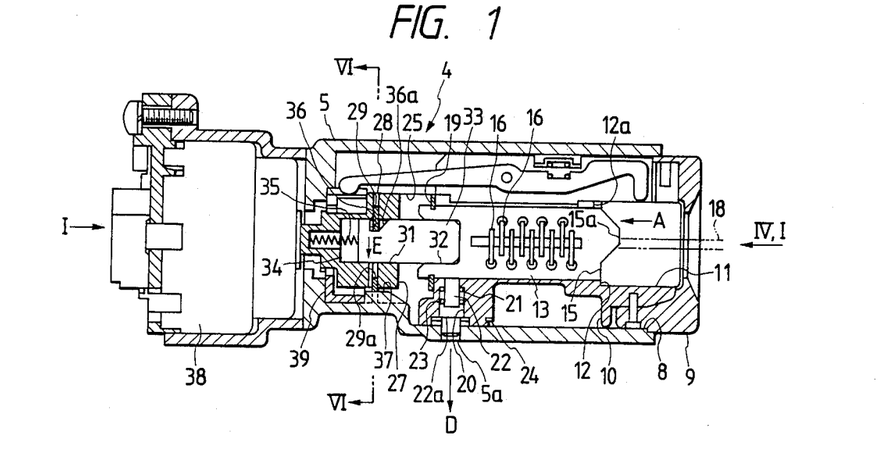
FIG. 1 is a top sectional view of a key-operated ignition device of the present invention.
Figure 2:
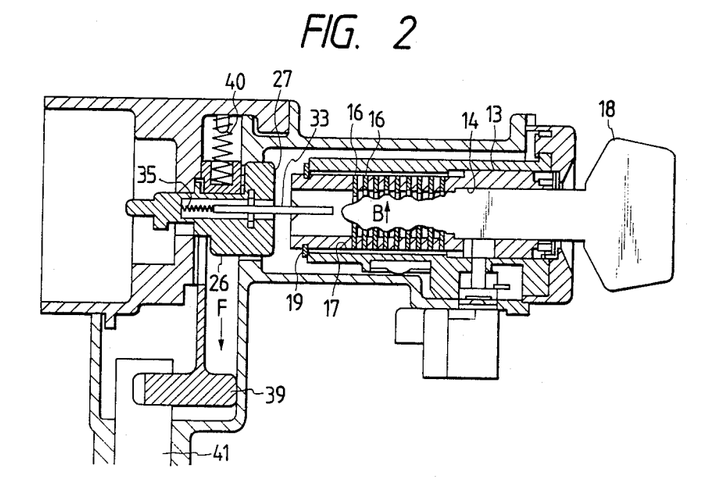
FIG. 2 is a partial cutaway view of the device along line I—I.

In accordance with the invention and as shown in FIG. 1, the key-operated ignition device comprises case 5 and has a cylinder insertion opening 8 extending to the outer end of the case. A key cylinder 9 is inserted in the opening 8. Key cylinder 9 has a cylindrical body 10 having a rotor insertion opening 11 and an inside halfway stepped portion 12 having a projection 12a. As shown in FIGS. 1 and 2, a key rotor 13 is fitted in the rotor insertion opening 11 so that the rotor is turnable around the axis thereof and movable in the axial direction of the case. Key rotor 13 has a key hole 14 and a peripheral stepped portion 15, a part of which has a notch 15a. When key rotor 13 is in each of an "ACC", switch-on position and a "LOCK" position, the notch 15a faces the projection 12a so that key rotor 13 can be moved inward in direction shown by an arrow A in FIG. 1. A plurality of locking plates 16 are provided in key rotor 13. Helical springs not shown in the drawing surge the locking plates 16 in a direction shown by an arrow B in FIG. 2, so that when key rotor 13 is put into the "LOCK" position and a key 18 is pulled out of key hole 14 as shown in FIG. 4, the locking plates are fitted in the locking groove 17 of the body 10 of key cylinder 9 to prevent the key rotor from being turned.

Figure 4:
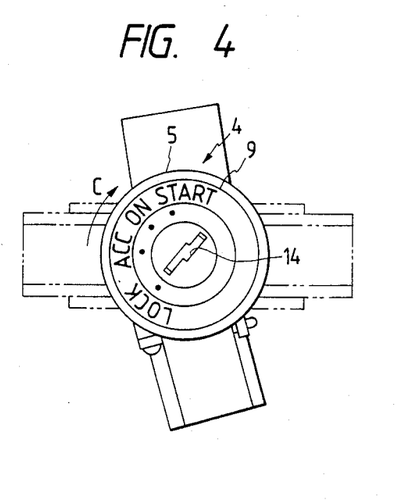
FIG. 4 is a plan view of the device along arrow II of FIG. 3.

When key 18 is inserted into key hole 14, the ends of all the locking plates 16 are made flush with the outside circumferential surface of key rotor 13 as shown in FIG. 2., so that the key rotor can be turned in a direction shown by an arrow C in FIG. 4. As shown in FIG. 1, a stop ring 19 is provided to prevent key rotor 13 from coming off the cylinder body 10. The cylinder body 10 has a through hole 20 near the inner end of the body, and an inside stepped portion 21 on the hole. A stopper pin 22 having a flange 22a on the halfway portion of the pin is slidably fitted in the through hole 20. A helical spring 23 is provided between the stepped portion 21 and the flange 22a and urges the stopper pin 22 in a direction shown by an arrow D in FIG. 1, so that the tip of the pin is fitted in the through hole 5a of the case 5 near the inner end of the cylinder insertion opening 8. A plate 24 is calked to the cylinder body 10 near the outer end of the through hole 20 thereof to prevent the stopper pin 22 from coming off key cylinder 9 when the cylinder is not yet inserted in the cylinder insertion opening 8 of the case 5.

The case 5 has a stepped hole 25 continuous to the inner end of the cylinder insertion opening 8. A locking cam 27 having an outside circumferential cam surface 26 is rotatably fitted as a rotor in the outer portion of the stepped hole 25, and has a slit 28 extending perpendicularly to the axis of the cam. A flat restriction plate 29 is slidably fitted as a restrictor in the slit 28. A helical spring 30 always urges the restriction plate 29 in a first direction shown by an arrow E in FIG. 1.

The locking cam 27 has a rectangularly-shaped coupling hole 31 extending in the axial direction of the cam and communicating with the slit 28. Key rotor 13 has a rectangularly-shaped coupling hole 32 opposed to that 31 of the cam 27. A flat coupling plate 33 is fitted at one end thereof in the coupling hole 32 and projects out of key rotor 13. The coupling plate 33 is slidably inserted at the other end thereof in the coupling hole 31, and extends through the through hole 29a of the restriction plate 29. The locking cam 27 has a hole 34 continuous to the inner end of the coupling hole 31. A helical spring 35 is fitted in the hole 34 and extends to the coupling plate 33 so that the spring urges the coupling plate and key rotor 13 in the direction reverse to the arrow A. The turning of key rotor 13 is transmitted to the locking cam 27 through the coupling plate 33. A cam 36 is formed by notching the coupling plate 33 at one edge thereof, and has a slope 36a which is located nearer key rotor 13 than the other portion of the cam is.

Figure 6:
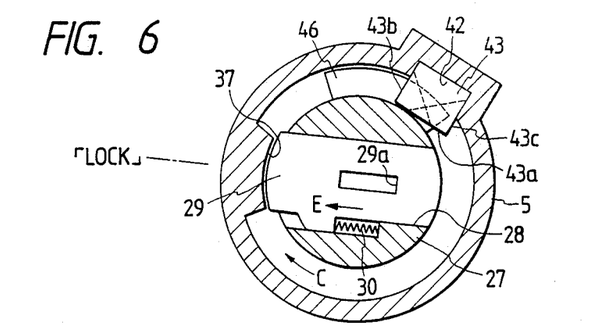
FIG. 6 is a sectional view of the device in the lock position along line VI—VI of FIG. 1.

When key rotor 13 is not moved inward in the direction A by pushing, as shown in FIG. 1, the position of the through hole 29a of the restriction plate 29 corresponds to that of the cam 36. When key rotor 13 is put into the "LOCK" position shown in FIG. 4, by a restricting projection 37 provided on the inside surface of the case 5 at the stepped hole 25, the tip of the restriction plate 29, is put on the restricting projection as shown in FIG. 6. When key 18 is inserted into key hole 14, key rotor 13 is unlocked so that the key rotor can be put into the "ACC" position, an "ON" position and a "START" position sequentially by turning the inserted key in the direction C.

According to the invention and as shown in FIG. 1, an ignition switch 38 is provided so that the state thereof is shifted as the locking cam 27 movingly coupled to key rotor 13 is turned. A locking member 39 is driven by the cam surface 26 of the locking cam 27 as shown in FIG. 2. A helical spring 40 urges the locking member 39 in a direction shown by an arrow F in FIG. 2. A locking bar 41 is coupled to the locking member 39.

Figure 11:
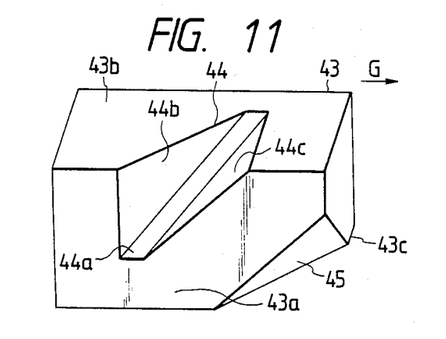
FIG. 11 is a perspective view of the sliding member of the device.
Figure 12:
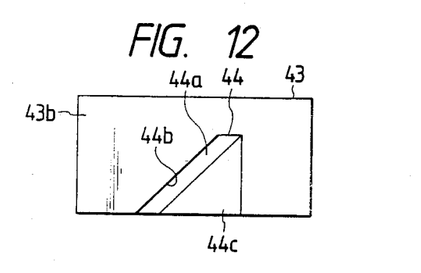
FIG. 12 is a plan view of the sliding member.

As shown in FIG. 6, the inside circumferential surface of the case 5 has a groove 42 having a rectangular cross section and extending in parallel with the axis of the case. A sliding member 43 having a nearly square cross section is slidably fitted in the groove 42 and located so that the tip of the restriction plate 29 can be opposed to the sliding member. The sliding member 43 can be slid while being guided by the groove 42, so that the sliding member is put into a first position shown in FIG. 13 or into a second position shown in FIG. 14. As shown in FIG. 11, the sliding member 43 has a guide notch 44, to which the tip of the restriction plate 29 corresponds. The notch 44 extends not only in the first facet 43a of the sliding member 43, which corresponds to the locking cam 27, but also in the second facet 43b of the sliding member, which corresponds to one side edge 29b of the tip of the restriction plate 29 when the locking cam 27 is put into a locking position. The guide notch 44 has a guide facet 44a constituting the bottom of the notch and having a small width, a restriction facet 44b continuous to the left-hand edge, of the guide facet and perpendicular to the second facet 43b of the sliding member, and a guide facet 44c continuous to the right-hand edge of the guide facet 44a and perpendicular to the first facet 43a of the sliding member, as shown in FIG. 11. The guide facet 44c slopes down leftward. The sliding member 43 has a slope 45 located at the right-hand end of the member and extending in the first and second facets 43a and 43b of the member. The outside circumferential surface of the locking cam 27 is formed with a projection 46, which corresponds to the slope 45 and acts as a cam portion to move sliding member 43 between first and second positions.

In accordance with the operation of the key-operated ignition appliance is described in detail as follows. When key 18 in an "ACC" position shown in FIG. 4 and turned in the direction C, the key is put into an "ON" position or a "START" position. At that time, the key rotor 13, the coupling plate 33 and the locking cam 27 are turned in the direction C so that the state of the ignition switch 38 is shifted. When key 18 is put into each of the "ON" position and the "START" position, the locking member 39 is put on the cam surface 26 of the locking cam 27 so that the locking member is displaced against the urging force of the helical spring 40 in a direction reverse to the arrow F. At that time, the tip of the locking bar 41 is separated from the locking ring 7 so that the steering shaft 2 is unlocked.

Figure 7:
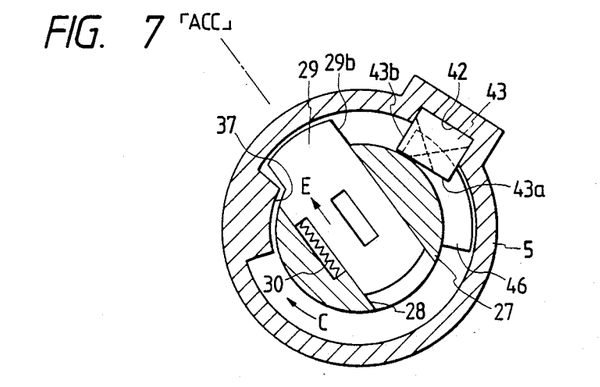
FIG. 7 is a sectional view of the device in the ACC position along line VI—VI of FIG. 1.

If the key 18 is released from the "START" position, the key is automatically turned back into the "ON" position. Even if key 18 is thereafter turned from the "ON" position to the "ACC" position in order to be turned further into a "LOCK" position, the tip of the restriction plate 29 comes into contact with the side of the restricting projection 37 as shown in FIG. 7, so that the key is prevented from being turned to the "LOCK" position.

When key 18 is turned from the "ON" position to the "ACC" position, the notch 15a of the peripheral portion of key rotor 13 coincides with the projection 12a of key cylinder 9 so that the key rotor and locking cam 27 can be slid in the direction A by pushing key 18 into the case 5. At the time of the sliding of key rotor 13, the coupling plate 33 is slid in the direction A so that the restriction plate 29 is moved against the urging force of the helical spring 30, in a direction reverse to the arrow E, while being guided by the slope 36a of the cam 36. As a result, the tip of the restriction plate 29 is released from the restricting projection 37 and made flush with the outside circumferential surface of the locking cam 27 so that the cam is allowed to be turned in a direction reverse to the arrow C. For that reason, key 18 pushed in can be turned to the "LOCK" position in a direction reverse to the arrow C. When the fingers are released from key 18 thus turned to the "LOCK" position, the coupling plate 33 and key rotor 13 are turned back by the urging force helical spring 35 so that the plate and rotor are put into states shown in FIG. 1.

When key 18 is turned to the "LOCK" position in the direction reverse to arrow C, the tip of the restriction plate 29 is put into contact with the top of the restricting projection 37 by the urging force of the helical spring 30 as shown in FIG. 6. When the locking cam 27 is thus put into the "LOCK" position, the locking member 39 is released from the cam surface 26 of the locking cam so that the locking member is moved in the direction F by the urging force of the helical spring 40 when key 18 is pulled out of key hole 14. When the steering wheel 3 is then turned so that the locking groove 7a of the locking ring 7 coincides with the tip of the locking bar 41, the tip of the bar is fitted in the locking groove so that the steering shaft 2 and the steering wheel 3 are locked not to be turned.

When key 18 in the "LOCK" position is pulled out of key hole 14, the locking plates 16 are protruded into the locking groove 17 of the body 10 of key cylinder 9 so that key rotor 13 is locked not to be turned.

When key 18 is inserted into key hole 14, and key rotor 13 is turned from the "LOCK" position, the tips of the locking plates 16 are made flush with the outside circumferential surface of the key rotor so that the key rotor is allowed to be turned. When key 18 is then turned into the "ACC" position, which is a ignition switch-off position, in the direction C, locking cam 27 is put into an unlocked position through the action of the coupling plate 33, and locking member 39 is put on the cam surface 26 of locking cam 27. At that time, locking member 39 and locking bar 41 are displaced against the urging force of the helical spring 40 in a direction reverse to the arrow F, the tip of the locking bar is separated from the locking groove 7a of the locking ring 7, and steering shaft 2 and steering wheel 3 are unlocked and free to turn. When key 18 is turned into the "ACC" position in the direction C as mentioned above, the tip of the restriction plate 29 is disengaged from restricting projection 37 and protruded into stepped hole 25 along the side of the projection so that key 18 is prevented from being turned into the "LOCK" position, as shown in FIG. 7.

Figure 8:
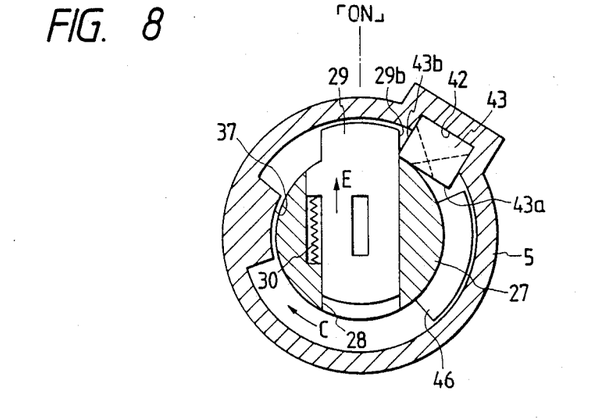
FIG. 8 is a sectional view of the device in the ON position along line VI—VI of FIG. 1.
Figure 9:
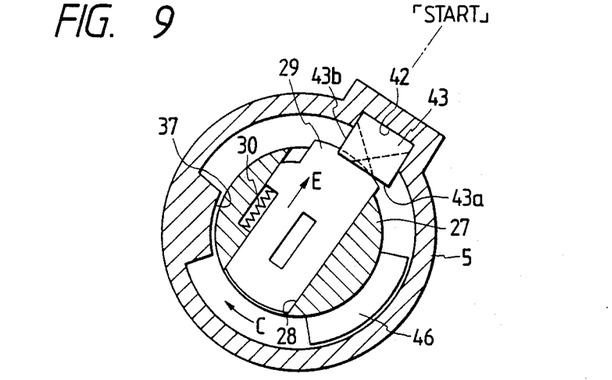
FIG. 9 is a sectional view of the device in the START position along line VI—VI of FIG. 1.
Figure 13:
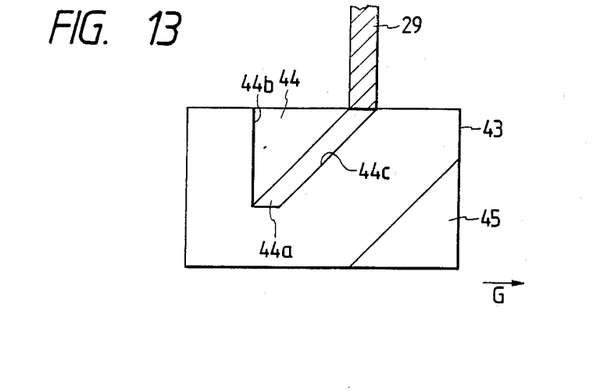
FIG. 13 is a side view of the sliding member in the first position and the restriction plate.
Figure 14:
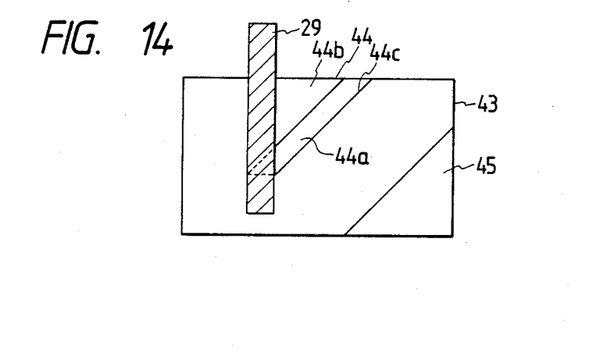
FIG. 14 is a side view of the sliding member in the second position and the restriction plate.
Figure 15:
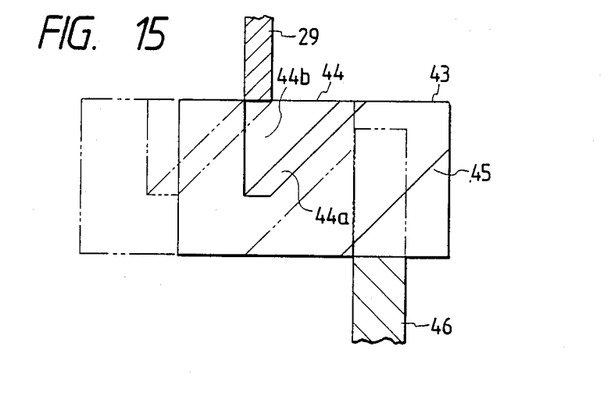
FIG. 15 is a side view indicating the sliding member and the restriction member.
Figure 16:
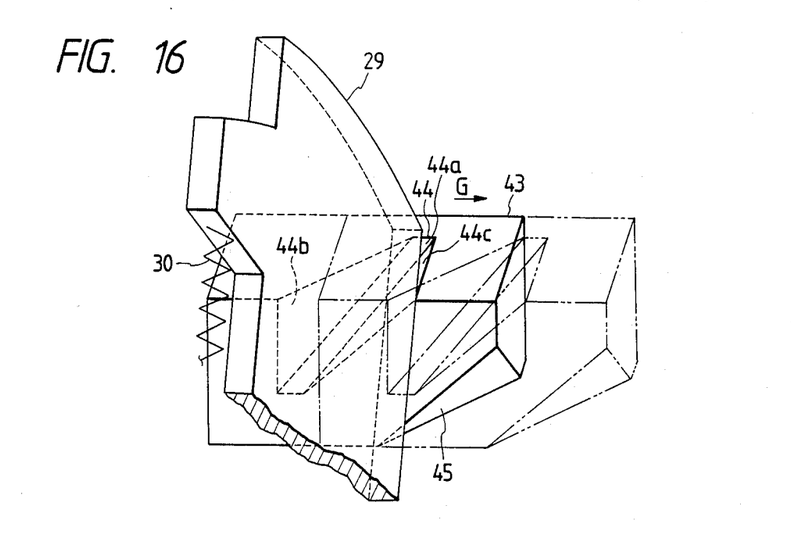
FIG. 16 is a perspective view of the sliding member and the restriction plate.

When key 18 is in the "ACC" position, cam projection 46 is on sliding member 43 at the right-hand end, as shown by a two-dot chain line in FIG. 15 and the sliding member is in the first position shown in FIG. 13. When the key 18 and rotor 13 is then turned together with the locking cam 27 into the "ON" position, the sliding member 43 remains in the first position so that one side edge 29b of the restriction plate 29 is located near the corner between the first and second facets 43a and 43b of the sliding member as shown in FIG. 8, and the restriction plate 29 is opposite of the right-hand end of the guide facet 44c as shown in FIGS. 13 and 15. When the key 18 is then turned into the "START" position in the direction C, locking cam 27 is turned in the same direction so that the tip of the restriction plate 29 is guided by the guide facet 44c and engaged with the guide facet 44a, and the sliding member 43 is displaced in a direction shown by an arrow G in FIG. 11, so that the tip of the restriction plate is moved on the guide facet 44a. When the sliding member 43 thereafter reaches the second position shown in FIG. 14, the restriction facet 44b comes into contact with the side of the restriction plate 29 as shown by two-dot chain lines in FIG. 16, to prevent the sliding member from being moved further in the direction G.

Figure 10:
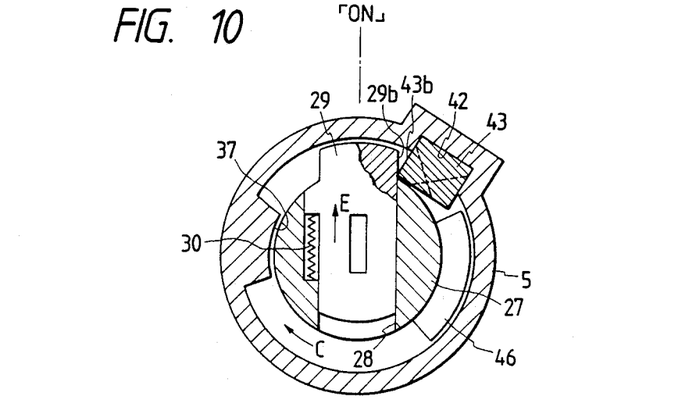
FIG. 10 is a sectional view of said device in the ON position along line VI—VI of FIG. 1 after the START position.
Figure 17:
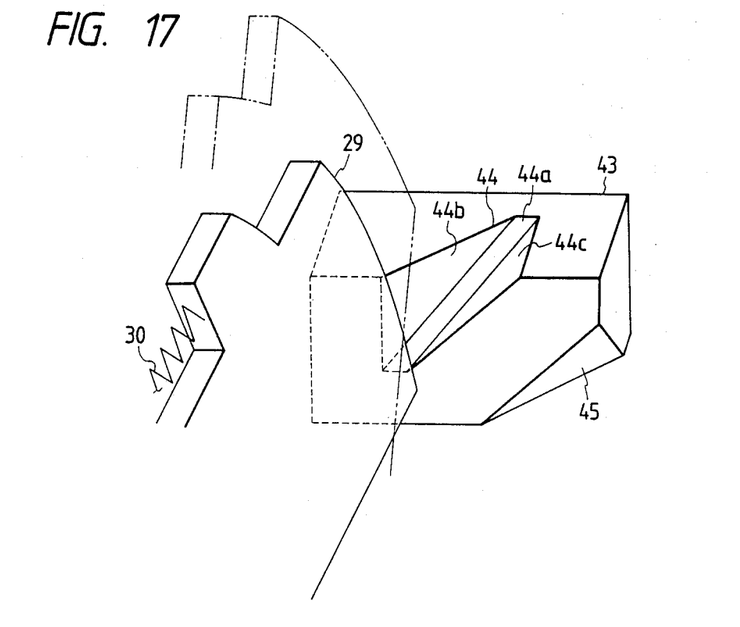
FIG. 17 is a perspective view of the sliding member and the restriction plate.

When key 18, rotor 13 and locking cam 27 are thus turned into the "START" position so that the engine of the motor vehicle is started, the fingers are released from the key so that the locking cam is turned back into the "ON" position as shown in FIG. 10, by a return spring provided at the ignition switch 38 but not shown in the drawings. At that time, the tip of the restriction plate 29 is disengaged from the first facet 43a of the sliding member 43 and protruded from the locking cam 27 by the urging force of the helical spring 30 as shown by full lines in FIG. 10 and two-dot chain lines in FIG. 17. Although the tip of the restriction plate 29 is engaged by the guide notch 44 when locking cam 27 is turned from the "START" position to the "ON" position, the sliding member 43 remains in the second position because the urging force of the helical spring 30 is too weak to move sliding member 43 back to the first position.

Even if a driver of the motor vehicle tries to turn the key 18 toward the "START" position, because he is unaware that the engine is already running, the right-hand side edge of restriction plate 29 is engaged with the corner between the first and second facets 43a and 43b of the sliding member 43, located in the second position, to prevent the locking cam 27 from being turned in the direction C, as shown in FIG. 10. For that reason, the engine starter of the vehicle is prevented from being rotated while the engine is already running, to protect the engine and the engine starter from damage.

When the key 18 is turned back together with rotor 13 and locking cam 27 into the "ACC" position as shown in FIG. 7, the cam projection 46 is opposed to the slope 45 of the sliding member 43 so that the member is slid in a direction reverse to the arrow G. As a result, the sliding member 43 is moved back into the first position shown by full lines in FIG. 13 and shown by two-dot chain lines in FIG. 15, so that the key 18 can be turned from the "ON" position into the "START" position as described above.

In the above-described embodiment, restriction plate 29 is provided in locking cam 27 which is formed with cam projection 46, and the sliding member 43 is provided to face plate 29, cam 27 and projection 46. However, a second embodiment of the present device may be otherwise embodied so that restriction plate 29 and sliding member 43 are provided at key rotor 13 or ignition switch 38, and the cam projection can be provided to face plate 29 and the member 43.

After the key 18 is once turned from the "ON" position into the "START" position in the above-described embodiment so that the engine is started, the key is turned back into the "ON" position as mentioned above. Since the key 18 is prevented from being then turned from the "ON" position into the "START" position directly, the engine starter is surely kept from being rotated as the engine is running. If the key in the "ON" position is to be turned into the "START" position, the key needs to be once turned into the "ACC" position which is a switch-off position. If the key 18 in the "ON" position is turned into the "ACC" position as the engine is running, the engine is stopped. Besides, the engagement of the restriction plate 29 with the restricting projection 37 serves to prevent the locking cam 27 from being directly turned into such a position as to lock the steering gear of the motor vehicle. Since the prevention through the engagement does not require an increase in the number of the component parts of the key-operated ignition device, the constitution of the device is simplified.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A key-operated ignition device for driving an engine starter comprising:
   a rotor operatively turned by a key, said rotor being disposed in a case of said device;
   a rotor driven coupling plate fitted on one end of said rotor;
   means for selectively shifting an ignition switch between switch-off, switch-on, and start positions, said shifting means being coupled to said coupling plate;
   a sliding member disposed in said case, said sliding member being selectively moved between first and second positions along a longitudinal axis of said case;
   restriction means in cooperation with said shifting means for moving said sliding member between said first and second positions, wherein when said sliding member is in said first position said rotor can be turned from said switch-on to said start position, and when said sliding member is in said second position said rotor is prevented from again turning to said start position without first turning from said switch-on position to said switch-off position.

2. The key-operated ignition device according to claim 1, wherein a restricting projection is provided on an inside surface of said case in proximity to said shifting means.

3. The key-operated ignition device according to claim 2, wherein said shifting means comprises a locking cam movably coupled with said coupling plate and said locking cam having an outside circumferential cam surface.

4. The key-operated ignition device according to claim 3, wherein said restriction means comprises a restriction plate disposed for movement within said locking cam.

5. The key-operated ignition device according to claim 1, wherein said restriction means cooperates with a guide notch provided on said sliding member.

6. The key-operated ignition device according to claim 5, wherein when said sliding member is in said first position said restriction means is located at said guide notch so that said rotor may be turned from said switch-on position to said start position.

7. The key-operated ignition device according to claim 1, wherein said sliding member is moved from said first position to said second position by a cam portion of said shifting means, wherein said cam portion corresponds with said sliding member to move said sliding member to said second position when said rotor is turned from said switch-on position to said start position.

8. The key-operated ignition device according to claim 5, wherein when said sliding member is in said second position, said restriction means is remote from said guide notch.

9. The key-operated ignition device according to claim 7, wherein when said rotor is turned from said switch-on position to said switch-off position, said cam portion returns said sliding member from said second position to said first position.

10. The key-operated ignition device according to claim 4, wherein said restriction plate also prevents said rotor from being directly turned from said switch-off position to a lock position.

11. The key-operated ignition device according to claim 10, wherein when said rotor is turned from said switch-off position toward said lock position said restriction plate contacts a side of said restricting portion of said case, so that said rotor is prevented from being turned to said lock position.

12. The key-operated ignition device according to claim 4 further comprising locking means for locking a steering gear when said rotor is moved to a lock position.

13. The key-operated ignition device according to claim 12, wherein said locking means comprises a locking member disposed at said outside circumferential cam surface of said lock cam and a locking bar coupled to said locking member to lock said steering gear when said rotor is in said lock position.

14. The key-operated ignition device according to claim 13, wherein said rotor is turned to said lock position said rotor is pushed into said case and said restriction plate is guided along a cam slope of said coupling plate to move said restriction plate into said locking cam so that said restriction plate corresponds with the restriction projection of said case.

* * * * *